J. ADAMS.
Heating Drum.
No. 85,196.
Patented Dec. 22, 1868.
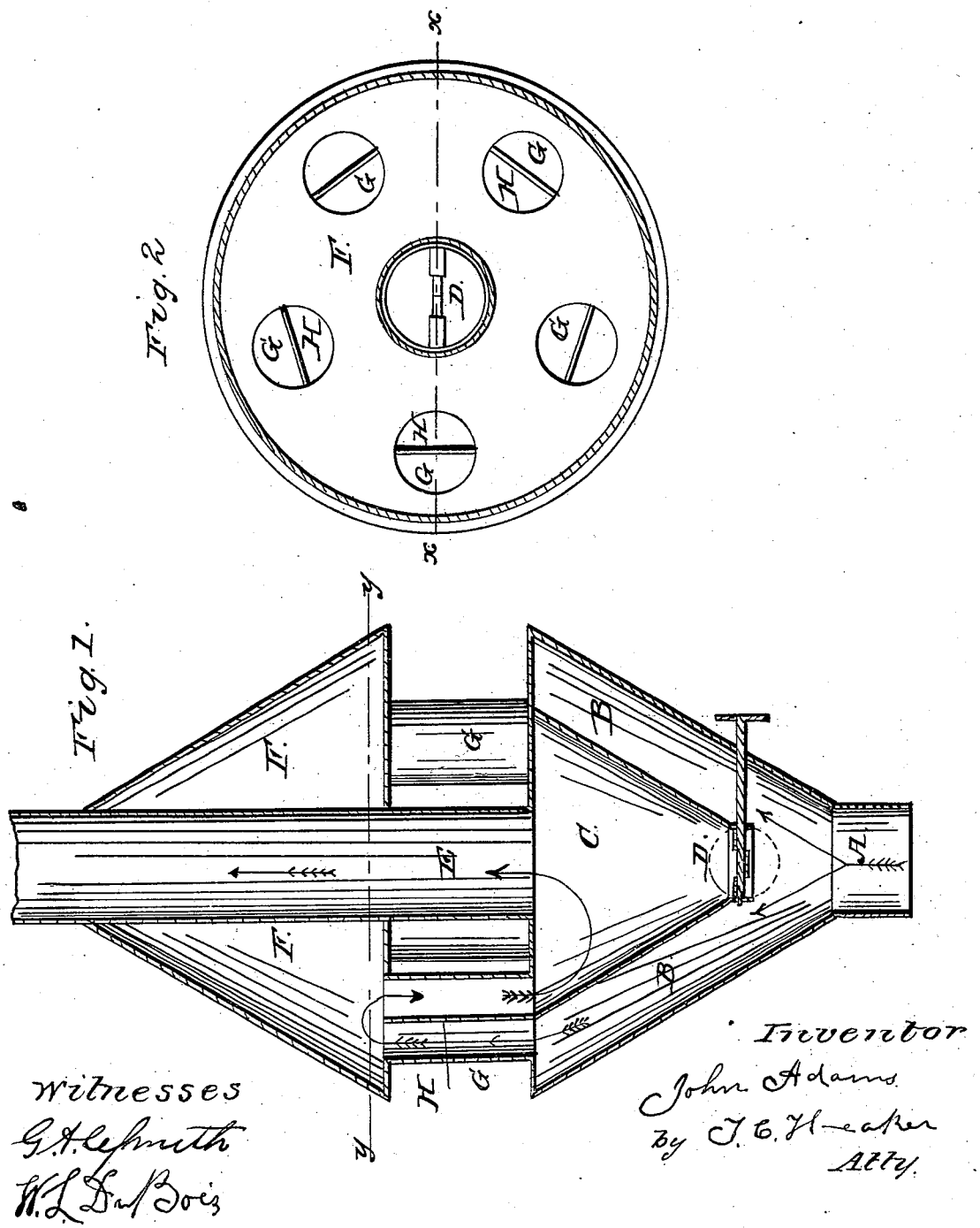

JOHN ADAMS, OF FINDLAY, OHIO.

*Letters Patent No. 85,196, dated December 22, 1868.*

IMPROVEMENT IN STOVE-DRUMS.

The Schedule referred to in these Letters Patent and making part of the same.

*To all whom it may concern:*

Be it known that I, JOHN ADAMS, of Findlay, in the county of Hancock, and State of Ohio, have invented a new and useful Improvement in Stove-Drums; and I do hereby declare that the following is a full, clear, and exact description thereof, reference being had to the accompanying drawings, in which—

Figure 1 is a central vertical section through the line $x$ $x$ of fig. 2, and

Figure 2 is a horizontal section through the line $y$ $y$ of fig. 1.

The nature of my invention consists in the peculiar arrangement of cones or chambers and flues, as hereinafter described.

To enable others skilled in the art to make and use my invention, I will proceed to describe its construction and operation.

In the drawing—

A represents the pipe which leads from the heater.

To the upper end of the pipe A is attached a cone or chamber, B.

Inside of this cone is another, C, at the bottom of which is a damper, D.

In the top of the cone or chamber C is an aperture, around which is placed the pipe E for the direct draught, and the escape of gas and heat.

Around the pipe E, and above the cone or chamber B, is another cone or chamber, F.

The cones or chambers B and F are connected together by a series of flues, G.

These flues are double, being divided at or near their centres by a partition, H.

These flues are arranged so that the partition H comes directly over the outer edge of the cone or chamber C.

Its operation is as follows:

The heat or steam passes up through the pipe A; thence, when the damper D is closed, up outside the cone C, through the outer passage of the flues G, into the cone or chamber F; thence, through the inner passage of the flues G, into the cone C, and from that escapes through the pipe E. The direction of the heat is indicated by the arrows in fig. 1.

By opening the damper D, the heat will pass directly up through the cone C, and out through the pipe E.

Having thus fully described my invention,

What I claim, and desire to secure by Letters Patent, is—

1. The double flues G, when constructed and arranged substantially as shown and described.

2. The combination of the cones or chambers B C and the damper D, substantially as shown and described.

3. The combination of the cones or chambers B F and the flues G, substantially as shown and described.

JOHN ADAMS.

Witnesses:
 JOHN T. CARLIN,
 D. B. BEARDSLEY.